(12) United States Patent
Suwa

(10) Patent No.: US 7,816,477 B2
(45) Date of Patent: Oct. 19, 2010

(54) ACRYLIC RELEASE AGENT PRECURSOR, RELEASE AGENT ARTICLE, AND PROCESS FOR PRODUCING RELEASE AGENT ARTICLE

(75) Inventor: Toshihiro Suwa, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 1322 days.

(21) Appl. No.: 10/509,719

(22) PCT Filed: Apr. 21, 2003

(86) PCT No.: PCT/US03/12236

§ 371 (c)(1),
(2), (4) Date: Oct. 1, 2004

(87) PCT Pub. No.: WO03/095578

PCT Pub. Date: Nov. 20, 2003

(65) Prior Publication Data

US 2005/0118352 A1    Jun. 2, 2005

(30) Foreign Application Priority Data

May 10, 2002    (JP) .................... 2002-135660

(51) Int. Cl.
- *C08F 20/10* (2006.01)
- *C08F 120/10* (2006.01)
- *C08F 220/10* (2006.01)
- *C09J 7/00* (2006.01)
- *B05D 3/06* (2006.01)

(52) U.S. Cl. .................. 526/328; 428/41.8; 427/516; 427/519

(58) Field of Classification Search ............ 427/508, 427/207.1, 208.4, 516, 519; 526/328; 428/41.8
See application file for complete search history.

(56) References Cited

U.S. PATENT DOCUMENTS

| | | | | |
|---|---|---|---|---|
| 3,998,997 A | * | 12/1976 | Mowdood et al. | 526/271 |
| 4,111,769 A | * | 9/1978 | Stueben | 522/139 |
| 4,165,266 A | * | 8/1979 | Stueben et al. | 522/46 |
| 4,600,649 A | | 7/1986 | Leo | |
| 4,737,559 A | * | 4/1988 | Kellen et al. | 526/291 |
| 5,128,386 A | | 7/1992 | Rehmer et al. | |
| 5,283,092 A | | 2/1994 | Everaerts et al. | |
| 5,552,451 A | * | 9/1996 | Everaerts et al. | 522/46 |
| 5,560,796 A | | 10/1996 | Yoshimura | |
| 5,648,425 A | | 7/1997 | Everaerts | |
| 5,670,006 A | * | 9/1997 | Wilfong et al. | 156/236 |
| 5,954,907 A | * | 9/1999 | LaRose et al. | 156/275.5 |

FOREIGN PATENT DOCUMENTS

| | | |
|---|---|---|
| DE | 27 43 979 | 4/1979 |
| JP | 7502558 | 3/1995 |
| JP | 7502560 | 3/1995 |
| JP | 7300569 | 11/1995 |
| JP | 2001240775 | 9/2001 |
| WO | WO 01/64805 | 9/2001 |
| WO | WO 01/64805 A2 * | 9/2001 |

OTHER PUBLICATIONS

Moresi et al., "Rheology of scleroglucan dispersions," Journal of Food Engineering 50 (2001) 235-245.*

* cited by examiner

*Primary Examiner*—William Philip Fletcher, III

(57) ABSTRACT

The present invention provides an acrylic release agent precursor, which makes it possible to prepare an acrylic release agent efficiently as much as possible in a comparatively small ultraviolet dose, regardless of the component. An acrylic release agent precursor which contains a poly(meth)acrylate ester having a group capable of being activated by ultraviolet radiation and has a storage elastic modulus of $1 \times 10_2$ to $3 \times 10_6$ Pa at 20° C. and a frequency of 1 Hz, wherein said precursor, after irradiation with ultraviolet radiation, has a contact angle of 15° or more to a mixed solution of methanol and water (volume ratio of 90/10) having wetting tension of 25.4 N/m.

8 Claims, 1 Drawing Sheet

US 7,816,477 B2

ACRYLIC RELEASE AGENT PRECURSOR, RELEASE AGENT ARTICLE, AND PROCESS FOR PRODUCING RELEASE AGENT ARTICLE

FIELD

The present invention relates to a release agent precursor containing a polymer such as poly(meth)acrylate ester, a release agent article using the same, and a process for producing the same.

BACKGROUND

An adhesive tape and an adhesive sheet are obtained by forming an adhesive on a surface of a substrate and are usually stored after taking up in a roll form. In that case, the back surface of the substrate is generally coated with a release agent to protect the adhesive surface of the adhesive tape or adhesive sheet. When using the adhesive tape or adhesive sheet, it can be easily unwound. Alternatively, the adhesive surface is covered with a separate substrate coated with a release agent, thereby to protect the adhesive surface.

Various types of release agents have been known. Particularly, a release agent having a long-chain alkyl group (long-chain alkyl-based release agent) is useful in the electronic industry because it is comparatively cheap and is less likely to cause contamination.

One example of the long-chain alkyl release agents is disclosed in the pamphlet of International Publication WO 01/64805 and/or KOKAI (Japanese Unexamined Patent Publication) No. 2001-240775. Each of these long-chain alkyl release agents is an acrylic release agent comprising a product obtained by irradiating an acrylic release agent precursor, which contains a poly(meth)acrylate ester and has a storage elastic modulus of $1 \times 10^2$ to $3 \times 10^6$ Pa at 20° C. and a frequency of 1 Hz, with ultraviolet radiation, said acrylic release agent having a contact angle of 15° or more with a mixed solution of methanol and water (volume ratio of 90/10) having a wetting tension of 25.4 N/m. This acrylic release agent has comparatively high adhesion with a substrate made of polyethylene terephthalate after applying on the substrate. This acrylic release agent can maintain a comparatively low peel force from a pressure-sensitive adhesive such as acrylic pressure sensitive adhesive even when exposed to high temperature. Furthermore, this acrylic release agent substantially has no influence on the residual adhesion of the adhesive.

As is apparent from the above description, the acrylic release agent described above is prepared by passing through the step of irradiating the acrylic release agent precursor with ultraviolet radiation. However, the ultraviolet irradiation dose required in this step varies widely depending on the composition of the acrylic release agent precursor. When the composition which requires a small dose to form a release agent is compared with the composition which requires a large dose, the dose varies sometimes by 3 to 5 times.

SUMMARY

It is desirable in the preparation of the acrylic release agent that there be (1) no significant change in the required ultraviolet irradiation dose depending on composition of the acrylic release agent precursor and (2) a reduction in ultraviolet irradiation dose in view of an increase in productivity.

The present invention is directed to providing an acrylic release agent precursor, which makes it possible to prepare an acrylic release agent having the above-mentioned releasability as efficiently as possible in a comparatively small ultraviolet dose. Additionally, the present invention provides a release agent article using the acrylic release agent precursor, and a process for producing the same.

The present invention provides an acrylic release agent precursor which contains a poly(meth)acrylate ester having a group capable of being activated by ultraviolet radiation (also referred to as "an ultraviolet active group") and has a storage elastic modulus of $1 \times 10^2$ to $3 \times 10^6$ Pa at 20° C. and a frequency of 1 Hz, wherein said precursor, after irradiation with ultraviolet irradiation, has a contact angle of 15° or more to a mixed solution of methanol and water (volume ratio of 90/10) having a wetting tension of 25.4 N/m.

A release agent article is provided by forming the release agent precursor on a substrate and irradiating the release agent precursor with ultraviolet irradiation.

When using the acrylic release agent precursor described above, it becomes possible to efficiently prepare an acrylic release agent.

Generally, when using a mixture of a poly(meth)acrylate ester and a free radical generating agent having an ultraviolet active group, the ultraviolet irradiation dose can not be reduced in order to prepare the acrylic release agent. Therefore, the poly(meth)acrylate ester having an ultraviolet active group used in the present invention is essentially different from a simple mixture of a poly(meth)acrylate ester and a free radical generating agent having an ultraviolet active group.

The present invention will be explained by way of preferred embodiments. As will be apparent to a person with an ordinary skill in the art, the present invention is not limited to these embodiments described in detail.

As used herein, the term "contact angle" is defined as a value of a contact angle as measured by a mixed solution (volume ratio of 90/10) having a wetting tension of 25.4 N/m described in JIS K6768: 1999. This measurement is conducted under the conditions of a temperature of 23±1° C. and a relative humidity of 50±5%.

As used herein, the storage elastic modulus (G') of the acrylic release agent precursor is a value as measured at 20° C. and a frequency of 1 Hz in a shear mode, using a viscoelasticity meter (for example, Dynamic Analyzer RDA II manufactured by Rheometrics).

DETAILED DESCRIPTION

Figure 1:
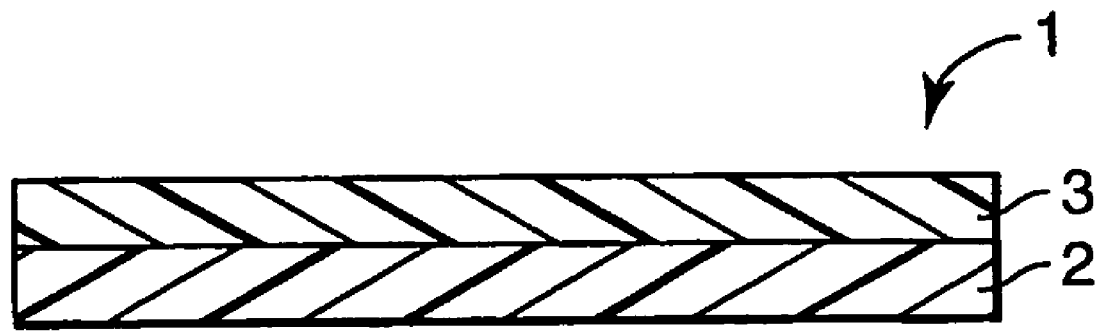
FIG. 1 is a cross-sectional view showing one embodiment of a release sheet or a release tape of the present invention.

The acrylic release agent precursor of the present invention is a polymer composition containing a polymer such as poly(meth)acrylate ester having an ultraviolet active group.

The poly(meth)acrylate is, for example, a copolymer formed from an acrylic monomer component containing a (meth)acrylate having $C_{12-30}$ alkyl group (hereinafter also referred to as a "first alkyl (meth)acrylate") and a (meth)acrylate having $C_{1-12}$ alkyl group (hereinafter also referred to as a "second alkyl (meth)acrylate"), and a (meth)acrylate ester having an ultraviolet active group.

In this case, the alkyl group of the first alkyl (meth)acrylate constitutes a comparatively long side chain in the copolymer. Such a long alkyl side chain is effective to reduce a surface energy of the acrylic release agent. This surface energy is estimated by the "contact angle" as described above.

Preferred long alkyl side chain does not have a polar functional group such as carboxyl group, hydroxyl group, or nitrogen- or phosphorus-containing group. Although the long alkyl side chain can usually maintain a comparatively low peel force at low temperature and high temperature, it is difficult to maintain at a comparatively low peel force when a release agent having the polar functional group is exposed to high temperature. Preferred first alkyl (meth)acrylate containing a long alkyl side chain includes lauryl (meth)acrylate, cetyl (meth)acrylate, stearyl (meth)acrylate, or behenyl (meth)acrylate.

The alkyl group of the second alkyl (meth)acrylate constitutes a comparatively short side chain in the copolymer described above. Such a short alkyl side chain can reduce the glass transition temperature of the release agent precursor to 30° C. or lower. As a result, it can also reduce the storage elastic modulus to a value within a range from $1 \times 10^2$ to $3 \times 10^6$ Pa, thus making it possible to provide smooth peeling from a pressure-sensitive adhesive to the acrylic release agent. Preferred short alkyl side chain does not have the polar functional group described above, similar to the alkyl side chain of the first alkyl (meth)acrylate.

The copolymer does not limit the amount of two kinds of acrylic monomer components described above is not usually limited, but contains the first alkyl (meth)acrylate or second alkyl (meth)acrylate in the amount within a range from 10 to 90% by weight based on the total weight of the first alkyl (meth)acrylate and second alkyl (meth)acrylate. When the amount of the first alkyl (meth)acrylate exceeds about 90% by weight, the acrylic release agent has comparatively high crystallinity as a result of a strong influence of the first alkyl (meth)acrylate and tends to provide jerky peel. On the other hand, when the amount of the second alkyl (meth)acrylate exceeds about 90% by weight, the acrylic release agent, tends to provide a comparatively high peel force, as a result of a strong influence of the second alkyl (meth)acrylate.

According to the present invention, both of the first alkyl (meth)acrylate and the second alkyl (meth)acrylate have a $C_{12}$ alkyl group.

In another aspect, it can be said that the poly(meth)acrylate ester is derived from a monomer component containing an alkyl (meth)acrylate having a branched $C_{8-30}$ alkyl group, and a (meth)acrylate ester having an ultraviolet active group. Examples of the alkyl (meth)acrylate having a branched $C_{8-30}$ alkyl group include 2-ethylhexyl (meth)acrylate, 2-hexyldodecyl acrylate, 2-heptylundeceyl acrylate, 2-octyldecyl acrylate, and isononyl (meth)acrylate. Such a (meth)acrylate having a branched side chain can reduce the storage elastic modulus and surface energy by lowering the crystallinity itself. Thus, it is not necessary for the acrylic release agent precursor to contain two components such as first alkyl (meth)acrylate and second alkyl (meth)acrylate described above as far as it has a branched $C_{8-30}$ alkyl group. The polymer of 2-hexyldecyl acrylate or 2-octyldecyl acrylate constitutes a preferred acrylic release agent precursor because it can simply reduce the surface energy of the release agent.

According to the present invention, as described above, the poly(meth)acrylate ester has an ultraviolet active group. This ultraviolet active group can generate a free radical in the release agent precursor by irradiation with ultraviolet radiation. The generated free radical promotes crosslinking of the release agent precursor and adhesion to the substrate, resulting in an improvement in adhesion between the substrate and the release agent. As far as the object and effect of the present invention is achieved, the ultraviolet active group is not specifically limited, but is preferably those derived from benzophenone or acetophenone. Introduction of the ultraviolet active group into the poly(meth)acrylate ester can be conducted by incorporating a (meth)acrylate ester having an ultraviolet active group as a monomer component and polymerizing the monomer component containing the (meth)acrylate ester. A preferred amount of the (meth)acrylate ester having an ultraviolet active group is within a range from 0.01 to 1.0% by weight per poly(meth)acrylate ester unit. When the amount of the (meth)acrylate ester having an ultraviolet active group is lower than 0.01% by weight, there is a tendency that a substantial effect of reducing the ultraviolet irradiation dose required to form the release agent can not be obtained. Even if the amount of the (meth)acrylate ester having an ultraviolet active group is greater than 1.0% by weight, the effect is already sufficient under conventional conditions of irradiation with ultraviolet radiation and an influence of the addition of a new component is likely to be exerted on the peel force.

The polymer of the acrylic release agent precursor preferably has a weight-average molecular weight within a range from 100,000 to 2,000,000. When the polymer has a weight-average molecular weight of lower than about 100,000, the resulting acrylic release agent precursor has an undesirable high peel force. When the polymer has a weight-average molecular weight of greater than about 2,000,000, satisfactory peel performances are obtained, however, it tends to become difficult to treat the polymer during polymerization reaction described hereinafter because of its high viscosity.

The monomer component described above can be usually polymerized in the presence of a predetermined amount of a polymerization initiator, thereby to form an acrylic release agent precursor. Preferred polymerization is solution polymerization. This solution polymerization can be usually conducted in the state where the monomer component is dissolved in a solvent, together with the polymerization initiator, in an atmosphere of an inert gas such as nitrogen at 50 to 100° C. As a result, the solution of the polymer as a reaction product can be used as it is after the completion of the polymerization. As the solvent, for example ethyl acetate, methyl ethyl ketone or heptane can be used. If necessary, the molecular weight of the polymer may be controlled to the above-described range by adding a chain transfer agent to the solvent.

The polymerization initiator is not specifically limited. For example, an azobis compound such as 2,2'-azobisisobutyronitrile, 2,2'-azobis(2-methylbutyronitrile) or 2,2'-azobis(2,4-dimethylvaleronitrile) and a peroxide such as benzoyl peroxide or lauroyl peroxide may be used as the polymerization initiator. Particularly, 2,2'-azobisisobutyronitrile and 2,2'-azobis(2-methylbutyronitrile) are commercially available from Wako Pure Chemicals Industries, Ltd. under the trade name of V-60 and V-59. Preferably, the polymerization initiator is used in the amount within a range from 0.005 to 0.5% by weight based on the total weight of the monomer component. When the amount of the polymerization initiator is lower than about 0.005% by weight, the polymerization reaction tends to proceed comparatively slowly. On the other hand, when the amount of the polymerization initiator is greater than about 0.5% by weight, the resulting acrylic release agent precursor tends to have a comparatively low molecular weight.

The acrylic release agent precursor as described above is converted into an acrylic release agent by irradiating with ultraviolet radiation, after the precursor is coated on a substrate. This acrylic release agent has a contact angle of 15° or more to a mixed solution of methanol and water (volume ratio of 90/10) having a wetting tension of 25.4 N/m. Such a contact angle is advantageous, since it effectively inhibits a pressure-sensitive adhesive from wetting and spreading over the surface of the acrylic release agent and also reduces the affinity with the adhesive.

Also this acrylic release agent can provide a certain, comparatively low peel force of 0.05 to 3 N/25 mm to a pressure-sensitive adhesive such as an acrylic pressure-sensitive adhesive. Such a peel force is advantageous to easily peel a release sheet from an adhesive tape or an adhesive sheet. Preferably, the acrylic release agent has a peel force of lower than 0.2 N/25 mm, as measured by the process described in the examples, to a general acrylic pressure-sensitive adhesive such as the acrylic pressure-sensitive adhesive in the examples described hereinafter.

In FIG. 1, a cross-sectional view of one embodiment of a release sheet (or a release tape) as a release agent article of the present invention is shown. This release sheet (1) is composed of a substrate (2) and an acrylic release agent (3) formed on the substrate (2). This acrylic release agent (3) is obtained by irradiating the acrylic release agent precursor of the present invention with ultraviolet radiation. Usually, this acrylic release agent is formed on the substrate in the thickness within a range from 0.01 to 1 μm. The acrylic release agent is generally obtained by irradiating with ultraviolet radiation after coating with the acrylic release agent precursor. As disclosed in the pamphlet of International Publication WO 01/64805 and/or KOKAI (Japanese Unexamined Patent Publication) No. 2001-240775, the acrylic release agent adheres to the substrate by the irradiation with ultraviolet radiation, even though the acrylic release agent has no polar functional group. As the substrate, for example, a film made of plastic such as polyester or polyolefin (for example, polyethylene terephthalate, polyethylene naphthalate or polybutylene terephthalate) or a paper can be used. Preferred thickness of the substrate is within a range from 10 to 300 μm.

Usually, the acrylic release agent precursor is produced by the solution polymerization as described above and exists in the state of a polymer solution. Therefore, the substrate is coated with the polymer solution in the thickness within a range from 0.01 to 1 μm, and preferably from 0.05 to 0.5 μm, using a coating means such as bar coater. When the thickness is lower than 0.01 μm, it is difficult to form a uniform coating and the peel force of the acrylic release agent tends to be increased. Even if the thickness exceeds about 1 μm, an influence is hardly exerted on the peel force of the acrylic release agent. If necessary, the polymer solution may be applied after diluting with a diluent until a predetermined viscosity is achieved. Examples if the diluent include ethyl acetate, butyl acetate, methyl ethyl ketone, methyl isobutyl ketone, hexane, heptane, toluene, xylene and/or methylene chloride.

The acrylic release agent precursor applied as described above is converted into an acrylic release agent by irradiation with ultraviolet radiation. Unlike electron beam, it is not necessary to irradiate with ultraviolet radiation under reduced pressure on in an atmosphere of an inert gas such as nitrogen. Therefore, the irradiation with ultraviolet radiation becomes easier than that with electron beam. Such an acrylic release agent can adhere closely to the substrate as described above. According to the present invention, the dose of irradiation with ultraviolet radiation varies depending on the kind and structure of the poly(meth)acrylate, but may be a given low dose within a range from 10 to 100 $mJ/cm^2$. As described above, the poly(meth)acrylate of this acrylic release agent precursor has an ultraviolet active group. Therefore, the release agent article can be efficiently produced in a short time.

The present invention was explained by way of preferred embodiments, but the present invention is not limited thereto.

The poly(meth)acrylate ester may be derived from a plurality of monomer components. For example, the first alkyl (meth)acrylate and second alkyl (meth)acrylate may be derived from a plurality of monomer components, respectively.

Usually, the monomer component has no polar functional group on the side chain. However, the monomer component may have a polar functional group on the side chain as far as the acrylic release agent precursor and the acrylic release agent have the storage elastic modulus and contact angle described above.

EXAMPLES

The present invention will now be explained in detail by way of examples. As will be apparent to a person with an ordinary skill in the art, the present invention is not limited to these examples. In the following examples, "parts" are by weight unless otherwise specified.

Production of Release Agent Article

Example 1

First, 100 parts of an NK ester ISA manufactured by OSAKA ORGANIC CHEMICAL INDUSTRY LTD. and 0.03 parts of EBECRYL P36 manufactured by DAICEL-UCB COMPANY LTD. were added as monomer components to a mixed solvent containing ethyl acetate and n-heptane in a weight ratio of 50:50 to prepare a reaction solution having a solid content of 50% by weight. The NK ester ISA is a mixture of 2-octyldecyl acrylate and 2-hexyldodecyl acrylate in a weight ratio of 1:1 and is also referred to as 2-heptylundecyl acrylate (see the pamphlet of International Publication WO 01/64085). Also EBECRYL P36 is an acrylate ester having an ultraviolet active group derived from benzophenone. Then, 0.004 parts of an initiator consisting of 2,2'-azobis(2,4 dimethylvaleronitrile) was added in a reaction vessel. This initiator is commercially available from Wako Pure Chemicals Industries, Ltd. under the trade name of V-65.

Then, the interior of this reaction vessel was purged with a nitrogen gas for 10 minutes. This reaction vessel was transferred in a rotary constant-temperature bath maintained at 50° C. and then allowed to stand therein for 20 hours. At this time, the monomer component in the vessel was reacted to produce a release agent precursor made of an acrylic copolymer. The storage elastic modulus of the resulting release agent precursor was measured as described hereinafter.

The acrylic release agent precursor was diluted with ethyl acetate to prepare a diluted solution having a solid content of 1% by weight without being separated from the solution. A 50 μm thick substrate made of polyethylene terephthalate (PET) was coated with the diluted solution, using a bar coater, dried to remove ethyl acetate and n-heptane, and then dried to obtain an acrylic release agent precursor having a thickness of about 0.1 μm.

Using a high-pressure mercury lamp (H type-valve) manufactured by Fusion System Corporation, the acrylic release agent precursor was irradiated with ultraviolet radiation in an energy density shown in Table 1 to obtain a sheet-like release agent article (hereinafter referred to as a "release sheet"). The peel force and contact angle of the release sheet thus obtained were measured as described hereinafter.

Example 2

In the same manner as in Example 1, except that 100 parts of an NK ester ISA and 0.1 parts of EBECRYL P36 manufactured by DAICEL-UCB COMPANY LTD. were added in this example, a release sheet was produced and evaluated.

Example 3

In the same manner as in Example 1, except that 100 parts of an NK ester ISA and 0.4 parts of EBECRYL P36 manufactured by DAICEL-UCB COMPANY LTD. were added in this example, a release sheet was produced and evaluated.

Example 4

In the same manner as in Example 1, except that 100 parts of an NK ester ISA and 0.8 parts of EBECRYL P36 manufactured by DAICEL-UCB COMPANY LTD. were added in this example, a release sheet was produced and evaluated.

Comparative Example 1

In the same manner as in Example 1, except that EBECRYL P36 was not used in this example, a release sheet was produced and evaluated.

Storage Elastic Modulus of Release Agent Precursor

The storage elastic modulus of the respective release agent precursors described above was measured at 20° C. and a frequency of 1 Hz in a shear mode, using a viscoelasticity meter (for example, Dynamic Analyzer RDA II manufactured by Rheometrics). The storage elastic modulus of these release agent precursors is shown in Table 1.

Peel Force of Release Agent Article

The peel force of the respective release sheets described above was determined in the following manner, using an acrylic pressure-sensitive adhesive sheet obtained by crosslinking a polymer derived from a monomer component containing butyl acrylate, acrylic acid and vinyl acetate in a weight ratio of 100:8:1.5 with 1% by weight of isophorone diisocyanate.

An acrylic pressure-sensitive adhesive sheet was stuck on a release sheet and then allowed to stand in an oven at 110° C. for 6 hours. The release sheet was taken out from the oven, together with the acrylic adhesive sheet, and then allowed to stand at room temperature (25° C.) overnight. When the release sheet was continuously peeled off from the acrylic adhesive sheet at a peel angle of 180° and a peeling rate of 300 mm/min. in a width of 25 mm using Autograph (AGS-100B) manufactured by Shimadzu Corp., a load applied to the release sheet was measured and the resulting load was taken as a peel force. The peel forces of the release sheets at various acrylic release agent precursors and ultraviolet energy densities are shown in Table 1.

Contact Angle of Release Agent

The contact angle of the release sheet was measured by using a contact angle meter CA-A manufactured by Kyowa Interface Science Co., LTD. In the measurement, a mixed solution of methanol and water (volume ratio of 90/10) having a wetting tension of 25.4 N/m described in JIS K6768: 1999 was used. At this time, the measurement was conducted within 5 seconds after the dropwise addition. The contact angles of the release sheets at various acrylic release agent precursors and ultraviolet energy densities are shown in Table 1.

TABLE 1

| | | Example 1 | Example 2 | Example 3 | Example 4 | Comparative Example 1 |
|---|---|---|---|---|---|---|
| | | \multicolumn{5}{c}{Composition ISA/P36 (wt %/wt %)} | | | | |
| | | 100/0.03 | 100/0.1 | 100/0.4 | 100/0.8 | 100/0 |
| | | \multicolumn{5}{c}{Storage elastic modulus (Pa) of release agent precursor} | | | | |
| | UV dose (mJ/cm$^2$) | $1.7 \times 10^3$ | $1.4 \times 10^3$ | $2.2 \times 10^3$ | $1.5 \times 10^3$ | $1.2 \times 10^3$ |
| Peel force (N/25 mm) | 10 | — | — | 16.7 | 7.9 | — |
| | 20 | — | — | 8.1 | 0.17 | — |
| | 30 | — | — | 0.16 | 0.16 | — |
| | 40 | 6.6 | 3.1 | 0.16 | 0.16 | 7.9 |
| | 60 | 0.97 | 0.16 | 0.16 | 0.16 | 3.6 |
| | 80 | 0.16 | 0.15 | 0.15 | 0.16 | 1.9 |
| | 100 | 0.16 | 0.15 | — | — | 0.16 |
| | 120 | 0.15 | 0.16 | — | — | 0.17 |
| | 200 | 0.15 | 0.16 | — | — | 0.16 |
| | 300 | — | — | — | — | 0.17 |
| Contact angle (degree) | 10 | 42.0 | 41.1 | 40.7 | 41.4 | 39.9 |
| | 20 | 41.3 | 41.3 | 40.5 | 41.0 | 39.7 |
| | 30 | 41.5 | 41.4 | 40.1 | 41.1 | 39.9 |
| | 40 | 41.3 | 41.1 | 39.7 | 41.1 | 39.8 |
| | 60 | 41.1 | 40.5 | 39.5 | 40.6 | 39.1 |
| | 80 | 40.4 | 40.2 | 38.8 | 40.3 | 38.7 |
| | 100 | 39.2 | 39.7 | 38.9 | 38.7 | 38.2 |
| | 120 | 39.4 | 38.2 | 38.3 | 38.8 | 38.5 |
| | 200 | 38.2 | 37.5 | 37.6 | 38.6 | 38.0 |
| | 300 | 37.3 | 37.9 | 37.7 | 38.1 | 37.5 |

According to Table 1, the storage modulus of the acrylic release agent precursor and the contact angle of the acrylic release agent of Examples 1 to 4 are $1.4 \times 10^3$ to $2.2 \times 10^3$ Pa and 37.3° to 42.0°, which satisfy the requirements of a storage modulus of $1 \times 10^2$ to $3 \times 10^6$ Pa and a contact angle of no less than 15° disclosed in WO 01/64805 and/or Japanese Unexamined Patent Publication (Kokai) No. 2001-240775.

Further, as is apparent from Table 1, the peel force within the underlined range has a given stable value and is preferred. It is found that, when the acrylic release agent precursor of Comparative Example 1 is not irradiated with ultraviolet radiation in a dose of no less than 100 mJ/cm², a release sheet having a desired peel force can not be provided. On the other hand, the acrylic release agent precursors of Examples 1 to 4 can provide a release sheet having a desired peel force in a reduced ultraviolet dose depending on the amount of EBECRYL P36.

All of the release sheets of Examples 1 to 4 have the peel force in the same level as that of Comparative Example 1 and a detrimental effect on peel force is not caused by EBECRYL P36, that is, an ultraviolet active group. Therefore, the acrylic release agent precursor using 0.8% by weight of EBECRYL P36, like Example 4, can provide a release sheet with five times more productivity than in the case of Comparative Example 1 using no EBECRYL P36, while maintaining the peel force.

Further, the above results suggest that when a dose of ultraviolet irradiation required to form a releasing sheet varies depending on composition of a releasing agent precursor, the releasing sheet can be produced with a constant dose of ultraviolet irradiation by adjusting an amount of acrylic ester having a group capable of being activated by ultraviolet radiation to be added.

Examples 5 to 8

In the same manner as in Examples 1 to 4, except that 4-acryloyloxybenzophenone (ABP) was used as the acrylate ester having benzophenone in place of EBECRYL P36 in these examples, acrylic release agent precursors were prepared and release sheets were produced and evaluated. The peel forces of these release sheets at various acrylic release agent precursors and ultraviolet energy densities are shown in Table 2.

TABLE 2

| | | Example 5 | Example 6 | Example 7 | Example 8 | Comparative Example 1 |
|---|---|---|---|---|---|---|
| | | \multicolumn{5}{c}{Composition ISA/ABP (wt %/wt %)} | | | | |
| | | 100/0.03 | 100/0.1 | 100/0.4 | 100/0.8 | 100/0 |
| | | \multicolumn{5}{c}{Storage elastic modulus (Pa) of release agent precursor} | | | | |
| | UV dose (mJ/cm²) | $1.2 \times 10^3$ | $2.2 \times 10^3$ | $1.1 \times 10^3$ | $1.6 \times 10^3$ | $1.2 \times 10^3$ |
| Peel force (N/25 mm) | 10 | — | 13.2 | 0.15 | 0.15 | — |
| | 20 | — | 1.1 | 0.15 | 0.17 | — |
| | 30 | 8.7 | 0.67 | 0.15 | 0.18 | — |
| | 40 | 1.6 | 0.17 | 0.15 | 0.18 | 7.9 |
| | 60 | 0.19 | 0.16 | 0.16 | 0.19 | 3.6 |
| | 80 | 0.19 | 0.16 | 0.17 | 0.20 | 1.9 |
| | 100 | 0.19 | 0.16 | — | — | 0.16 |
| | 120 | 0.17 | 0.16 | — | — | 0.17 |
| | 200 | 0.16 | 0.14 | — | — | 0.16 |
| | 300 | — | — | — | — | 0.17 |
| Contact angle (degree) | 10 | 40.7 | 41.4 | 41.2 | 41.6 | 39.9 |
| | 20 | 40.7 | 40.8 | 41.5 | 41.3 | 39.7 |
| | 30 | 39.8 | 40.5 | 41.3 | 40.7 | 39.9 |
| | 40 | 40.2 | 41.1 | 40.8 | 37.9 | 39.8 |
| | 60 | 39.7 | 40.6 | 40.2 | 38.4 | 39.1 |
| | 80 | 39.6 | 39.7 | 40.4 | 38.3 | 38.7 |
| | 100 | 39.0 | 38.8 | 39.5 | 37.7 | 38.2 |
| | 120 | 38.5 | 38.4 | 39.1 | 37.1 | 38.5 |
| | 200 | 38.6 | 37.5 | 38.1 | 36.4 | 38.0 |
| | 300 | 36.8 | 36.4 | 37.7 | 36.7 | 37.5 |

According to Table 2, the storage modulus of the acrylic release agent precursor and the contact angle of the acrylic release agent of Examples 5 to 8 are $1.1 \times 10^3$ to $2.2 \times 10^3$ Pa and 36.4° to 41.6°, which satisfy the requirements of a storage modulus of $1 \times 10^2$ to $3 \times 10^6$ Pa and a contact angle of no less than 15° disclosed in WO 01/64805 and/or Japanese Unexamined Patent Publication (Kokai) No. 2001-240775, as in case of Examples 1 to 4.

Further, as is apparent from Table 2, the peel force within the underlined range has a given stable value and is preferred. As is apparent from Table 2, when using ABP in the acrylic release agent precursor, a release sheet having a stable desired peel force can be provided in a reduced ultraviolet dose depending on the amount of ABP, similar to the case of EBECRYL P36 in Table 1. Also all of the release sheets of Examples 5 to 8 have the peel force in the same level as that of Comparative Example 1 and a detrimental effect on peel force is not caused by ABP, that is, an ultraviolet active group.

Comparative Example 2

In the same manner as in Comparative Example 1, except that 0.1% by weight of benzophenone (BP) was further added to a diluted solution containing an acrylic release agent precursor of 100 parts of an NK ester ISA in this example, a release sheet was produced and evaluated.

Comparative Example 3

In the same manner as in Comparative Example 1, except that 0.5% by weight of benzophenone (BP) was further added to a diluted solution containing a polymer of 100 parts of an NK ester ISA to prepare an acrylic release agent precursor in this example, a release sheet was produced and evaluated.

The peel forces of the release sheets at various acrylic release agent precursors and ultraviolet energy densities are shown in Table 3.

TABLE 3

|  |  | Example No. | | |
| --- | --- | --- | --- | --- |
|  |  | Comparative Example 2 | Comparative Example 3 | Comparative Example 1 |
|  | UV dose | Composition ISA/BP (mixture) (wt %/wt %) | | |
|  | (mJ/cm$^2$) | 100/0.1 | 100/0.5 | 100/0.0 |
| Peel force | 40 | 10.1 | 9.6 | 7.9 |
| (N/25 mm) | 60 | 7.3 | 6.1 | 3.6 |
|  | 80 | 2.6 | 2.8 | 1.9 |
|  | 100 | 0.17 | 0.18 | 0.16 |
|  | 120 | 0.19 | 0.18 | 0.17 |
|  | 200 | 0.16 | 0.17 | 0.16 |

As is apparent from Table 3, the acrylic release agent precursors of Comparative Examples 2 and 3 are irradiated with ultraviolet radiation in the same level as in Comparative Example 1, thus making it possible to provide a release sheet only in the same level as in Comparative Example 1. On the other hand, the acrylic release agent precursor of Example 1 can provide a release sheet in a reduced ultraviolet dose by introducing an ultraviolet active group into a molecule using only 0.03% by weight of EBECRYL P36. Therefore, it has been found that the ultraviolet irradiation dose is not reduced and an increase in productivity can not be expected merely by adding benzophenone. That is, the poly(meth)acrylate ester having an ultraviolet active group contained in the acrylic release agent precursor of the present invention is essentially different from a mere mixture of a poly(meth)acrylate ester and a free radical generating agent having an ultraviolet active group and the acrylic release agent precursor of the present invention can increase the productivity of the release agent.

The acrylic release agent precursor of the present invention make it possible to efficiently prepare an acrylic release agent in a comparatively small ultraviolet dose regardless of the component.

The invention claimed is:

1. An acrylic release agent precursor comprising a poly(meth)acrylate ester having a group that generates a free radical in the release agent precursor by irradiation with ultraviolet radiation and has a storage elastic modulus of $1 \times 10^2$ to $3 \times 10^6$ Pa at 20° C. and a frequency of 1 Hz, wherein
said precursor, after irradiation with ultraviolet radiation, has a contact angle of 15° or more to a mixed solution of methanol and water at a volume ratio of 90/10 and having a wetting tension of 25.4 N/m.

2. The acrylic release agent precursor according to claim 1, wherein the group that generates the free radical in the release agent precursor by irradiation with ultraviolet radiation is benzophenone.

3. A release agent article comprising a substrate and the release agent precursor of claim 2 formed on the substrate, wherein the release agent precursor has been irradiated with ultraviolet radiation.

4. The release agent article of claim 3, wherein the poly(meth)acrylate ester is derived from a monomer component containing
a first alkyl (meth)acrylate having a $C_{12-30}$ alkyl group,
a second alkyl (meth)acrylate having a $C_{1-12}$ alkyl group, and
a (meth)acrylate ester having a group that generates a free radical in the release agent precursor by irradiation with ultraviolet radiation.

5. The release agent article of claim 3, wherein the poly(meth)acrylate ester is derived from a monomer component containing
an alkyl (meth)acrylate having a branched $C_{8-30}$ alkyl group, and
a (meth)acrylate ester having a group that generates a free radical in the release agent precursor by irradiation with ultraviolet radiation.

6. The acrylic release agent precursor according to claim 1, wherein the poly(meth)acrylate ester is derived from a monomer component containing
a first alkyl (meth)acrylate having a $C_{12-30}$ alkyl group,
a second alkyl (meth)acrylate having a $C_{1-12}$ alkyl group, and
a (meth)acrylate ester having a group that generates a free radical in the release agent precursor by irradiation with ultraviolet radiation.

7. The acrylic release agent precursor according to claim 1, wherein the poly(meth)acrylate ester is derived from a monomer component containing
an alkyl (meth)acrylate having a branched $C_{8-30}$ alkyl group, and
a (meth)acrylate ester having a group that generates a free radical in the release agent precursor by irradiation with ultraviolet radiation.

8. A process for producing an acrylic release agent article, which comprises the steps of:
coating a substrate with an acrylic release agent precursor which contains a poly(meth)acrylate ester having a group that generates a free radical in the release agent precursor by irradiation with ultra violet radiation and has a storage elastic modulus of $1 \times 10^2$ to $3 \times 10^6$ Pa at 20° C. and a frequency of 1 Hz, and
irradiating the acrylic release agent precursor with ultraviolet radiation to form an acrylic release agent layer having a contact angle of 15° or more to a mixed solution of methanol and water at a volume ratio of 90/10 and having a wetting tension of 25.4 N/m.

* * * * *

UNITED STATES PATENT AND TRADEMARK OFFICE
CERTIFICATE OF CORRECTION

PATENT NO. : 7,816,477 B2  
APPLICATION NO. : 10/509719  
DATED : October 19, 2010  
INVENTOR(S) : Toshihiro Suwa Page 1 of 1

It is certified that error appears in the above-identified patent and that said Letters Patent is hereby corrected as shown below:

Title Page, Item (57) Abstract  
Line 7, delete "$1 \times 10_2$ to $3 \times 10_6$" and insert -- $1 \times 10^2$ to $3 \times 10^6$ --, therefor.  
Line 11, After "having" insert -- a --.

Column 12  
Line 50, in claim 8, delete "ultra violet" and insert -- ultraviolet --, therefor.

Signed and Sealed this  
Nineteenth Day of April, 2011

David J. Kappos  
*Director of the United States Patent and Trademark Office*